United States Patent
Sandberg

(10) Patent No.: US 8,435,323 B2
(45) Date of Patent: May 7, 2013

(54) BATCHWISE WORKING-UP RECYCLING MATERIALS IN A ROTATABLE REACTOR

(75) Inventor: Olof Sandberg, Skellefteå (SE)

(73) Assignee: Boliden Mineral AB, Skelleftehamn (SE)

( * ) Notice: Subject to any disclaimer, the term of this patent is extended or adjusted under 35 U.S.C. 154(b) by 1256 days.

(21) Appl. No.: 11/126,342

(22) Filed: May 11, 2005

(65) Prior Publication Data

US 2005/0284261 A1    Dec. 29, 2005

(30) Foreign Application Priority Data

Jun. 23, 2004   (SE) ..................... 0401618

(51) Int. Cl.
*C21C 1/04*    (2006.01)
*C21C 5/30*    (2006.01)

(52) U.S. Cl.
USPC ............................................. 75/375; 75/403

(58) Field of Classification Search ............. 75/581, 75/403, 375
See application file for complete search history.

(56) References Cited

U.S. PATENT DOCUMENTS

| | | | |
|---|---|---|---|
| 4,415,360 A | 11/1983 | Leirnes et al. | |
| 4,512,798 A | 4/1985 | Leirnes et al. | |
| 4,705,562 A | 11/1987 | Hedlund | |

FOREIGN PATENT DOCUMENTS

| | | |
|---|---|---|
| DE | 36 17 410 A1 | 11/1987 |
| DE | 3721843 A1 | 1/1989 |
| EP | 0 451 323 A2 | 10/1991 |
| EP | 1 243 663 A2 | 9/2002 |
| EP | 1609877 | 12/2005 |
| JP | 58-31044 | 2/1983 |
| JP | 62-501980 | 8/1987 |
| SE | 528 222 C2 | 9/2006 |
| SU | 1151768 A | 4/1985 |

OTHER PUBLICATIONS

European Search Report dated Jul. 6, 2006.
EA Search Report dated Jan. 12, 2006.
English Translation of Japanese Search Report.

*Primary Examiner* — Weiping Zhu
(74) *Attorney, Agent, or Firm* — Buchanan Ingersoll & Rooney PC

(57) ABSTRACT

A process for batchwise working-up valuable metals containing recycling materials having a content of organic constituents so high that its use as smelting materials in conventional metal smelting processes is not suitably or even possible. The material is charged to a tiltable reactor rotatable along its own longitudinal axis having a common opening for charging and emptying. The material is heated to a temperature promoting the expulsion of organic constituents by pyrolysis and/or combustion. The material consists at least to an essential part of such size fractions that admits a continuous charging during operation. The process is characterized in that said material during operation is charged continuously in an adjustable stream being controlled and/or adjusted by means of running measurements of different process variables so that the flow and composition of the combustible gas and the heat release is kept under control. A worked-up product substantially free from any organic substance is withdrawn from the reactor and is added to a conventional metal smelting process. The material is suitably supplied during operation by means of a charging equipment provided against or down through the single opening of the reactor by means of gravity and/or a pneumatic transport gas.

8 Claims, No Drawings

BATCHWISE WORKING-UP RECYCLING MATERIALS IN A ROTATABLE REACTOR

The invention relates to a process for batchwise working-up valuable-metals containing recycling materials having a content of organic constituents so high that its use as smelting materials in conventional metal smelting processes is not suitable or even possible. The material is charged to a tiltable reactor rotatable along its own longitudinal axis having a common opening for charging and emptying and is heated to a temperature promoting the expulsion of organic constituents by pyrolysis and/or combustion while forming a combustible gas. This gas is after combusted with secondary air outside the reactor. The material consists at least to an essential part of such size fractions, which admit a continuous charging during operation. With continuous in this connection is meant that the supply is performed as a stream of material during one of more continuous time periods and not that the material necessarily is supplied uninterruptedly during operation even if such supply is aimed at.

According to the invention it is possible to process recycling materials, which contain organic substances as well as valuable metals, such as combustible copper scrap materials, including cable scrap and electronic scrap, for example printed circuit cards and similar components from computers and mobile (cell) phones. Such materials often contain essential metal values in the form of various precious metals. Other recycling materials are secondary scrap products, such as lead scrap, for example battery scrap, and alloyed steels, for example stain-less steel scrap. With "valuable metals" are principally meant non-ferrous metals, such as copper, nickel, cobalt, tin, and precious metals as gold, silver, platinum, palladium, rhodium and iridium. The organic constituents who are present in the recycling products in question are often one or more from the group comprising plastics, rubber, paper, oil, tar, fats and greases. When working-up recycling materials of the above mentioned type, extremely high demands are raised firstly upon low metal losses, and secondly upon low emissions of harmful substances. With "one along its longitudinal axis rotatable and tiltable reactor" in this connection and also in the following is meant top-blown, in operation tilting, rotary converters of TBRC and Kaldo type and the like. Such furnaces are for example in a comparison with other rotatable furnaces, such as the furnaces of the drum-type, characterized in that they have a higher speed in operation, whereby a greater agitation and mixing can be imparted to the charge.

According to one process earlier developed by Boliden, which process has been in operation at Rönnskärsverken in northern Sweden for about twenty years with very good operation results, and which in different embodiments is described, for example in U.S. Pat. Nos. 4,415,360 and 4,705,562, metal containing waste and recycling products having an essential part of organic constituents are worked-up batchwise by expelling the organic constituents using pyrolysis and/or combustion in a rotatable converter, whereby the whole batch is charged when the reactor is in its rest position before the expulsion has begun. According to this known process the remaining inorganic product, also called the combustion remainder, after expelling the organic substances is withdrawn from the reactor either in the form obtained after the expulsion phase, that can be solid or at least partial molten. The main part of the remaining product may also, after adding slag formers or metal-smelt formers, be withdrawn or removed in the form of one or more smelts, for example slag, metal and speiss.

The worked-up product that is obtained by the process is essentially free from any organic constituents and can be supplied as a normal smelting material into a convenient pyrometallurgical unit belonging to a conventional smelter, for example a Pierce-Smith converter. The smelting of scrap and recycling products containing organic constituents in such units causes great problems and must often even be avoided due to the risks with heavy gas forming and dangerous splashes and erupted melt from the unit. Also burnt scrap without any organic contents causes inconveniences since it often contains a great part fine material, which will cause a severely dusting during handling and charging. This disadvantage may, however, to an essential degree be eliminated when working-up the products using the processes mentioned above, since the material in these processes may be obtained as an at least partially smelted combustion remainder, whereby the finer material of the remainder will be smelted or be taken up in a smelt in the reactor. This is, moreover, one of the most essential advantages compared with other known, even continuously operating, scrap burning processes having been made possible by a batch-wise processing in converters and similar reactors according the known Boliden process.

According to this known Boliden process the entire batch of scrap material is charged to the reactor, whereupon the reactor is heated during rotation, for example by means of an oil-oxygen lance, to a temperature so high that organic substances are expelled. The expulsion process is then allowed to continue under operating conditions as long as a gas is formed. The combustible gas formed is burnt by means of a secondary air stream outside the reactor and is thereafter allowed to pass through a gas cleaning apparatus before being released to the atmosphere. The amount of combustible gas is adjusted by means of the rotation of the reactor, so that the rotational speed is increased when an increased flow of combustible gas is required and opposite. The flow of secondary air which in most cases is the leakage air being sucked in at an opening gap between the gas outlet of the reactor and the hood collecting the reactor gas for transport through the gas cleaning system is almost constant. Such a treatment of the formed combustible gas and a suitable gas cleaning apparatus are described in the earlier document U.S. Pat. No. 4,415,360.

The composition of the combustible gas at a batch-wise processing, like the formed gas flow, will vary with time, since organic substances of different character decompose and/or are expelled at different rates. In the beginning of a treatment of a batch the most volatile and the most decomposable substances will contribute to the composition of the combustible gas, while at the end of the treatment more difficult-to-expel constituents are expelled. Consequently, it has proved that the burning of the combustible gas as well as the gas flow will not always be so uniform as required if not a change of the reactor rotation speed can or manages to compensate such variations and in this way could adjust the formation, i.e. the flow, of the combustible gas. This may cause problems to choose suitable ingoing materials and to compose a suitable mixture of materials in the ingoing batch.

In recent years it has arisen some problems relating to the burning of such materials that are worked up by our earlier, known process being more described in the introducing part. The background is partly that an increased amount of electronic recycling materials reaches the scrap market. This is due to the increased turnover of mobile phones and computers and other similar electronic products, and also to the more strengthened requirements from authorities on the recycling of such products. This has implied that the recycling materials which are worked up in the process described above on the one hand have changed its character, since they now will contain more and more of organic materials and on the other hand that the quantities which shall be taken care of with for recycling purpose are more and more increased. It has also been required an increased production capacity, which using any existing processes would require more or bigger furnace units and also a corresponding costly enlargement of the gas treating systems. Another possible way is to make use of the existing units more effectively than by any known processes and try to increase the productivity of such units. Since more and more of the recycling materials tend to consist of electronic scrap having great amounts of organic matter and our earlier known process using a batch-wise charging give rise to a limitation of the charge, as the same is defined by the volume of the charged unburnt materials, there was brought up an idea to try a continuous charging. Such a charging would solve the problem relating to the limitation of the ingoing charge volume of a batch and would also be favourable for the generation of heat in the furnace that will increase with an increasing portion of organic matter in the charge.

A continuous charging to a Kaldo converter or similar reactors is carried out at our process for producing lead according to the roast reaction process as earlier described in U.S. Pat. No. 4,512,798. In this process mutually inhomogeneous products are charged, namely a fine grained sulphide concentrate and oxide sulphate granules, but the products are from the beginning mixed in a predetermined relation adjusted for the performance of the reaction. No real process control is needed, since the actual reactions in the reactor only need a temperature being high enough for the process purpose.

It proved that using a continuous charging of the recycling materials to a rotating reactor, type a Kaldo furnace, for the expulsion of organic matter the rotational speed of the furnace could not be used for the process control, as was the case with the known Boliden process using a batchwise charging. It was most required to keep the rotational speed as high as possible during the charging period in order to obtain the high production as was aimed at and also for minimizing any risks for unburnt material to be accumulated in the reactor.

Another way to burn scrap materials using a continuous charging has been suggested in DE-A-3617410 for a batch-wise process for working up accumulator scrap in a slowly rotating drum furnace, for example a so called "Kurztrommelofen". Here the scrap is charged continuously and evenly under a uniform time during a slow rotation of the furnace and during a continuous and even adding of an oxygen surplus and a small amount of fuel. Thus no control is needed during the process and the gas may be released in any suitable way without any more combustion. So an oxidative combustion of the ingoing material is consequently attended and such is also the aim with this process. At this process there is attained during the whole operation by using a continuous charging that an oxygen surplus in proportion to the scrap material can be maintained. In this way no problems will exist relating to the taking care of the formed, completely combusted gas and any afterburning of the same as well as any process control. An oxidative combustion of the scrap material is, however, not to recommend nor practically possible for materials containing valuable metals. In such cases the valuable metals due to both the oxygen surplus atmosphere and the high temperature obtained by the oxygen surplus to an essential part will found their way to an oxide containing slag-type smelt phase, which then must be worked up separately and need as well extra time as costs.

The object of the present invention is to provide a process which makes it possible to perform a continuous charging to a rotating reactor of the kind being described here above and where the problems as indicated above with the composition and flow of the combustible gas formed and the variations thereof are decreased during a burning treatment, i.e. the treatment of a feed batch, without necessitating any oxygen surplus supply and thereby an oxidative combustion of the treated recycling material at high temperatures.

To this end the process is characterized by the steps disclosed in the attaching claims.

The material shall be continuously charged during operation, i.e. during one or more continuous time periods, in an adjustable stream, whereby the stream is controlled and/or adjusted using running measurements of various process variables. The flow and composition of the combustible gas and the heat release of the process are in this way kept under control, whereby the subsequent external after-burning process will be facilitated. A worked-up product substantially free from any organic substance is then withdrawn from the reactor and is added to a conventional metal smelting process.

The material is fed to the reactor during its operation suitably using a charging equipment provided against or through the one and only opening of the reactor, and is charged by aid of the force of gravitation and/or a pneumatic transport gas, for example pressure air. A suitable charging equipment of such a type is a lance being folding down through the opening, when the reactor in operation is inclined in a predetermined angle, and which can be pulled up before the reactor is raised to an upright rest position.

One or more of the process variables gas composition, temperature and gas flow may be used for the control or regulation. It is quite possible to perform the control rapidly and automatically by running treatment of the measuring values by means of computer applied, earlier produced algorithms.

The material, which is fed during operation, should preferably have a uniform composition, for example obtained by means of a good mixing procedure, but such is facilitated if the material has a uniform size, which easily can be obtained by means of a crushing and a screening procedure or by another sizing. It must, however, be pointed out that the process surprisingly can cope with somewhat different materials compositions without that the control function will run away.

Such material, which does not permit a charging during the operation, is fed as one or more part batches during the rest position of the reactor and/or during an initiated expulsion period.

The stream of material that is charged during operation may elegantly be controlled and/or regulated automatically and running based on running measurements of one or more process variables, such as the gas composition, temperatures and various flows, so the furnace rotational speed need no change. A general adjustment is, however, performed manually before the burning process by various choices of the quote oxygen supply and the amount of supplied recycling material. Set points are chosen based on practical experiences, so that as much as possible of the combustion will occur in the reactor, and thereby more smelt energy will be brought to the charged material. Different materials require different smelting energies. In this way the process is allowed to be performed optimally without jeopardizing the security and the process will also be less sensitive against any variations of the material composition and so on.

The rotational speed is in operation kept as high as possible in order partly to maintain an optimal productivity and partly to reduce the risk that unburnt material will be accumulated in the furnace. Only in case the process tends to not to follow the automatic control system the speed may be used for this purpose and be lowered in order to slow down the reactions in the furnace.

Slag forming or other melt-forming materials may be added during operation in order to absorb at least a part of the formed product in accordance with prior art.

The process according to the invention may thus be performed as an expulsion of organic constituents from valuable metals containing recycling materials being charged essentially continuous. The material is then charged with a lance into a reactor, which is maintained at conditions favourable for pyrolysis and/or combustion, and at which the charging is allowed to continue until the reactor is so filled as prescribed, and the process is allowed to continue as long as a combustible gas is obtained. Charging using a lance may, for example, be performed during the entire combustion if the reactor has a temperature being high enough for combustion of organic material either by the presence of a smelt or by another way.

The best heat transfer and, thus, the fastest gasification of organic material and the highest productivity, is obtained when the material is charged continuously at a high furnace rotation speed and then rapidly mixed into a high-viscous pulsy phase. Such a favourable high heat transfer is only possible to achieve with the aid of a continuous charging and an expulsion of the organic matter possible by using a rapidly rotating converter of the Kaldo type.

The invention will now be further disclosed in a preferred mode, by which a Kaldo furnace is used as the reactor. Such a Kaldo furnace is tiltable and also inclined and may at rest be raised in an upward position with the single opening for charging and emptying faced upwardly. In operation the furnace will rotate around its longitudinal axis in an inclined position in relation to the horizontal plane and adapted to an existing internal gas dome, which receives any outgoing gases.

Those recycling materials that are not suitable for a continuous feed are first charged to the reactor in an upright rest position, for example by means of a step belt that tips material down through the opening of the reactor. Then the reactor in an inclined reactor position during its rotation and the reactor content are heated in a suitable way, which may be by burning oil in a burner lance inserted downwards through the opening. When the temperature has raised high enough a pyrolysis and/or combustion is obtainable and a repulsion of organic constituents will begin. Now a continuous charging of material fractions being suited for such charging may be performed through a charging equipment, for example in the form of a lance, that in operation can be inserted downwardly in the reactor opening and then be removed again. These fractions may to a great extent consist of disintegrated and sieved printed circuit cards partly being made of plastics, but which contain an essential amount of valuable metals, for example precious metals. Organic constituents of the added materials are herein continuously and gradually expelled.

The expulsion may be obtained entirely by pyrolysis, i.e. by solely heating at a high temperature, but a supply of oxygen in the form of air, oxygen gas or oxygen enriched air is preferred so that a temperature needed for an expulsion is maintained, whereby any organic constituents are combusted at least partially. The organic constituents, especially any plastics, may have energy content comparable with that of oil. By means of the partial combustion a required temperature being high enough can be maintained in the reactor in order to obtain an effective expulsion. Thanks to the earlier mentioned after-burning with secondary air being sucked in through the opening gap between the reactor and the gas hood such a high gas temperature is obtained in the succeeding gas treating system. Thus, any formation is avoided of non-wanted, often harmful compounds, for example dioxins and the like, that can cause problems when destructing such materials as plastics at moderately high temperatures.

When the Kaldo furnace has been so filled as predetermined being the most suitable filling percent, the charging is interrupted and the rotation is allowed to continue as long as any gas is formed. After a complete expulsion of organic material there is left a solid combustion remainder and often even one or more melted phases in the furnace. These phases may be a metal phase that can be transmitted to a copper converter, or a slag phase that can be fed to another suitable place in the copper smelter. Also the solid combustion remainder may be fluxed to a slag by adding a slag former and be transmitted to the copper smelter, since the same contains some precious metals.

In comparison with earlier known batch-wise processes having a continuous charging during operation in a drum furnace, the process according to the invention provides essential advantages. The material is, thus, charged continuously into a tilting rotatable reactor, for example a reactor of the Kaldo type, that is able to impart to the material a substantial agitation and thus quite other possibilities for obtaining and maintaining a regular out-going flow of a combustible gas, since no oxygen surplus is maintained and thereby no risk for metal oxidation will occur, that may result in losses and/or necessitates costly recovering processes of valuable metals from dust and slags. According to the process there are, thus, several possibilities to control the process to an optimal productivity without any need of an oxygen surplus by a combination of controlling the ingoing material stream and a rapid furnace rotational speed. By these features it is possible to maintain a rapid gasification process. Besides a running and continuous control of the ingoing materials it is possible to change the rotational speed to slow down the reactions, if the process control is running away.

Due to the continuous charging performed the gas being formed has a composition and temperature that will not vary with time as it will when other batch-wise charging scrap burning operations are performed, and the gas has also a predetermined controlled flow and is thus also suited to be led to a present gas cleaning equipment without any problems.

Other advantages that are provided by the invention is a higher productivity than can be obtained using prior batch-wise processes, i.e. the amount of recycling material processed per hour, and a greater yield of recovered valuable metals.

Both an even temperature and an even flow of material and formed gas will contribute to uniform and controlled operation conditions, which counteract the formation of non-wanted volatile substances containing metals and even other harmful volatile reaction products, such as dioxins and the like, from the organic substance of the recycling products.

The invention claimed is:

1. A process for batchwise working-up of recycling material containing valuable metals, but having a content of organic constituents so high that the recycling material is not suitable for use as smelting materials in conventional metal smelting processes, comprising:

continuously charging the recycling material in an adjustable stream comprising size fractions that are suitable for continuous charging to a tiltable reactor that is rotatable along its own longitudinal axis, that has a common opening for charging and emptying, and that is heated to a temperature sufficient to expel organic constituents by pyrolysis and/or combustion during said continuous charging, wherein said continuous charging occurs through a charging lance extending through the common opening into the reactor when the reactor is in operation and in an inclined position;

measuring process variables, and controlling or adjusting the adjustable stream during the continuous charging based upon said measuring, thereby controlling the flow and composition of the combustible gas and the process heat release; and withdrawing from the reactor a product that is substantially free of organic substances and is suitable for addition to a conventional metal smelting process.

2. A process according to claim 1, wherein the recycling material is supplied during operation using charging equipment provided against or through the common opening of the reactor.

3. A process according to claim 2, wherein the process variables include one or more of gas composition, temperature and gas flow rate.

4. A process according to claim 2, wherein the recycling material is supplied by means of the force of gravity and/or a pneumatic transport gas.

5. A process according to claim 4 wherein the process variables include one or more of gas composition, temperature, and gas flow rate.

6. A process according to claim 1, wherein the recycling material is supplied by means of the force of gravity and/or a pneumatic transport gas.

7. A process according to claim 6, wherein the process variables include one or more of gas composition, temperature, and gas flow rate.

8. A process according to claim 1 wherein the process variables include one or more of gas composition, temperature, and gas flow rate.

* * * * *